Patented Dec. 24, 1940

2,226,124

UNITED STATES PATENT OFFICE 2,226,124

COMPOSITION OF MATTER

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Original application April 19, 1939, Serial No. 268,816. Divided and this application January 26, 1940, Serial No. 315,762

8 Claims. (Cl. 260—404)

This application is a division of our pending application for patent Serial No. 268,816, filed April 19, 1939, for Process for resolving petroleum emulsions, which resulted in U. S. Patent No. 2,192,993, dated March 12, 1940.

The object of our present invention is to provide a new material or composition of matter, that is particularly adapted for use as a demulsifier in the resolution of crude oil emulsions, but which may have uses in other arts that we have not yet investigated.

Attention is directed to our U. S. Patent No. 2,154,422, dated April 18, 1939. In said patent there is described, among other things, a new composition of matter, which is particularly adapted for use as a demulsifier in the resolution of crude oil emulsions, and which consists of a certain kind of complex amine derived by reaction between: (a) a polybasic carboxy acid body, particularly a dibasic carboxy acid body, such as phthalic anhydride; and (b) simpler amines of the kind therein described. It is pointed out in said patent that wherever a carboxyl radical, particularly the carboxyl radical of the polybasic carboxy acid, exists, it may be permitted to remain as such, or the hydrogen atom thereof may be replaced by some suitable metallic atom, or by some organic radical, or by any other suitable means indicated in said patent. One sub-class or species of the broad genus described in said patent is the type in which the carboxylic hydrogen atom has been replaced by an organic radical obtained by dehydroxylation of a hydroxylated basic amine, such as ethanolamine, diethanolamine, triethanolamine, etc.

Reduced to its simplest terms, the matter may be stated as follows: If the complex amine containing at least one carboxyl radical attached to a dibasic or polybasic carboxy residue be indicated in the following manner:

$$D.(COOH)_b$$

in which $b$ is a small whole number, then it is contemplated in said aforementioned U. S. Patent No. 2,154,422, dated April 18, 1939, that a compound of the type $$D.(COOZ)_b$$

shall be the obvious functional equivalent, in which Z represents any suitable atom or radical which replaced the acidic hydrogen atom of the carboxyl radical. The present application contemplates, as previously stated, the specific sub-class, which will be conveniently indicated temporarily as $$[D]\begin{bmatrix}(COOZ)_{b'}\\(COOT)_b\end{bmatrix}$$

in which all the various characters have their previous significance; $b'$ may be zero or a small whole number; and T is a residue obtained by dehydroxylation of a hydroxylated amine, such as ethanolamine, diethanolamine, triethanolamine, monoglycerylamine, diglycerylamine, propanolamine, and a large number of other suitable amines or acylated amines of the kind described in said aforementioned U. S. Patent No. 2,154,422, dated April 18, 1939, and which will be referred to in greater detail herein.

It is obvious that the particular sub-class herein contemplated may be obtained in various ways; for instance, by employing a polybasic carboxy acid, such as phthalic acid or the anhydride, and after the complex acidic amine is obtained, then reacting such product further with mono-ethanolamine, monobutanolamine, monopropanolamine, or an acylated amine or a similar compound, so that an esterification reaction takes place. Similarly, it is also obvious that one might employ phthalated ethanolamine, or a similar material, instead of phthalic anhydride, and thus the initial reaction between the polybasic carboxy acid body and the simpler amine would immediately result in a material of the kind herein contemplated.

For the sake of brevity, various subject-matter which appears in our U. S. Patent 2,154,422, dated April 18, 1939, previously referred to will be condensed; but where further details are required, reference is made to said co-pending application.

One can obtain or manufacture chemical compounds whose composition is indicated by the following formulas:

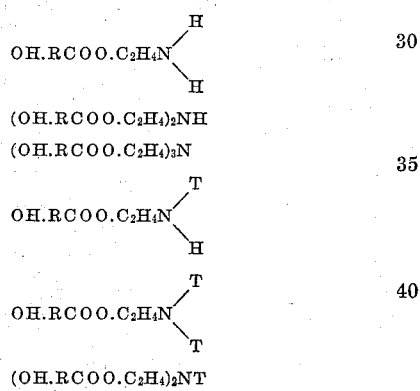

The compounds above described may be summarized by the following formula:

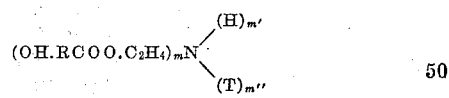

in which $m$ represents the numeral 1, 2 or 3, $m'$ represents the numeral 0, 1 or 2, and $m''$ represents the numeral 0, 1 or 2, with the proviso that $m+m'+m''=3$.

However, the radical C₂H₄, which appears in the above formula, may represent any similar radical, such as a C₃H₆ radical, C₄H₈ radical, etc., and therefore, the above formula may be rewritten:

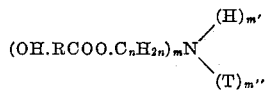

where *n* represents a small whole number, preferably not over 10.

In the above formulas, T represents an aliphatic hydrocarbon radical, such as a methyl, ethyl, propyl, amyl, or similar radical; or T may represent a non-hydroxy alicyclic radical, such as a cyclohexyl radical, or a non-hydroxy aralkyl radical, such as a benzyl radical; or the acylated radical obtained by replacing a hydrogen atom of the hydroxyl group of an alkylol radical by the acyl radical of a monobasic carboxy acid, such as acetic acid, butyric acid, oleic acid, stearic acid, naphthenic acid, abietic acid, or the like, all of which are characterized by having less than 32 carbon atoms. The alkylol radical, prior to acylation, may be a hydroxy alicyclic or a hydroxy aralkyl radical, provided that the hydroxy radical is attached to the aliphatic residue of the aralkyl radical. In the above formulas, OH.RCOOH represents a hydroxylated fatty acid, such as ricinoleic acid, hydroxystearic acid, dihydroxystearic acid, diricinoleic acid, triricinoleic acid, polyricinoleic acid, etc.; and OH.RCOO represents the oxy-acyl radical derived from such acid, i. e., the ordinary acid radical. Blown oils (oxidized oils) are not included.

As to the amines above described, which happen to be tertiary amines, it may be well to point out that these may be formed readily by a reaction involving an ester of the hydroxylated fatty acid and a corresponding amine. This may be illustrated in the following manner:

(OH.RCOO)₃C₃H₅ + (OH.C₂H₄)₃N →
(OH.R.COO.C₂H₄)₃N

Reference is made to co-pending application for patent, Serial No. 180,993, filed December 21, 1937, by Melvin De Groote, Bernhard Keiser and Charles M. Blair, Jr. If triethanolamine, as employed in the above formulas, is replaced by ethyl diethanolamine, or by diethyl ethanolamine, then one would readily obtain the other two types of tertiary amines illustrated. Reference is also made to U. S. Patent No. 2,167,349, dated July 25, 1939.

In the remaining three types of materials there is at least one amino hydrogen atom present. The manufacture of such type material may be illustrated by the following reactions:

OH.R.COOH + OHC₂H₄OH ⟶ OH.R.COO.C₂H₄OH
OH.R.COO.C₂H₄OH + HCl ⟶ OH.R.COO.C₂H₄Cl
OH.R.CO.Cl + OHC₂H₄OH ⟶ OH.R.COO.C₂H₄OH
OH.R.COO.C₂H₄OH + HCl ⟶ OH.R.COO.C₂H₄Cl
OH.R.COOH + OHC₂H₄Cl ⟶ OH.R.COO.C₂H₄Cl
OH.R.COOR' + OHC₂H₄Cl ⟶ OH.R.COO.C₂H₄Cl
OH.R.CO.Cl + OHC₂H₄Cl ⟶ OH.R.COO.C₂H₄Cl
OH.R.COO.C₂H₄Cl + NH₃ ⟶ OH.R.COO.C₂H₄NH₂
2OH.R.COO.C₂H₄Cl + NH₃ ⟶ (OH.R.COO.C₂H₄)₂NH
OH.R.COO.C₂H₄Cl + C₅H₁₁NH₂ ⟶ OH.R.COO.C₂H₄\NH/C₅H₁₁

Similar reactions to the one immediately preceding result in compounds, such as:

OH.R.COO.C₂H₄\NH/C₆H₁₁    OH.R.COO.C₂H₄\NH/C₆H₅CH₂

However, if maximum yields are not necessary, one need not resort to reactions of the kind previously described to produce amines having at least one amino hydrogen, but one may employ the following reactions:

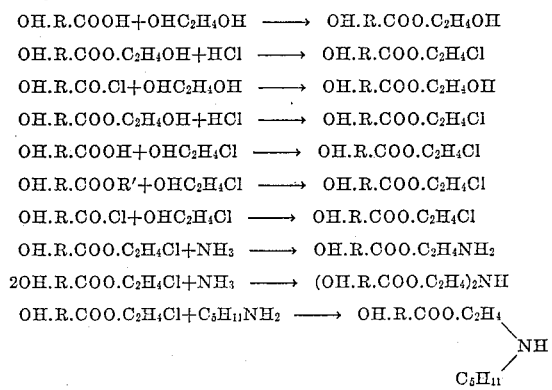

Naturally, if ethyl ethanolamine or a similar amine were to replace ethanolamine (monoethanolamine), one would obtain the remaining type of amine above illustrated.

Suitable hydroxy primary and secondary amines which may be employed to produce materials of the kind above described include the following: diethanolamine, monoethanolamine, ethyl ethanolamine, methyl ethanolamine, propanolamine, dipropanolamine, propyl propanolamine, etc. Other examples include cyclohexanolamine, dicyclohexanolamine, cyclohexyl ethanolamine, cyclohexyl propanolamine, benzyl ethanolamine, benzyl propanolamine, pentanolamine, hexanolamine, octyl ethanolamine, octadecyl ethanolamine, cyclohexanol ethanolamine, etc.

Similarly, suitable hydroxy tertiary amines, which may be employed, include the following: triethanolamine, diethanolalkylamines, such as diethanol ethylamine, diethanol propylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, dicyclohexanol ethylamine, benzyl diethanolamine, dibenzylethanolamine, benzyl dipropanolamine, tripentanolamine, trihexanolamine, ethyl hexyl ethanolamine, octadecyl diethanolamine, polyethanolamine, etc.

It is also known that one may have amines of the type:

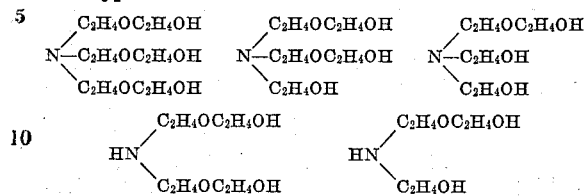

Such amines may serve as functional equivalents of the previously described amines.

All the amines of the kind above described and characterized by the formula:

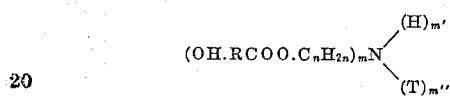

in which $n$ represents a small whole number, preferably less than 10, and $m$ represents the numeral 1, 2 or 3, $m'$ represents the numeral 0, 1 or 2, and $m''$ represents the numeral 0, 1 or 2, with the proviso that $m+m'+m''=3$, and T has its previous significance.

Such amines are not quaternary ammonium compounds or salts thereof. Similarly, these amine compounds are not amides. Furthermore, they are derived only from basic amines. The word "basic" is employed to exclude amines having little or no basicity, such as the ordinary aromatic amines, or any amine having at least one aryl radical directly joined to the amino nitrogen atom. Finally, it must be recognized that these materials have not lost any basicity in the form of the esterified amine or basic polyamine; that is, they combine with water to form a base, presumably a substituted ammonium compound, or substituted poly-ammonium compound. They combine with various acids to form salts.

For example, they may be combined with acetic acid, hydrochloric acid, lactic acid, chloracetic acid, nitric acid, butyric acid, phosphoric acid, oxalic acid, or any suitable organic or inorganic acid to form salts. It is understood that reference in the specification and appended claims to amines includes the basic form, and the salt form, and the salt form, as well as the amine itself. Naturally, where more than one basic nitrogen atom exists in a compound, it is not necessary that all such nitrogen atoms be present in the same form, that is, the basic form, or the salt form. In fact, it is immaterial as to the particular state in which a basic nitrogen atom radical is present. This statement applies with equal force and effect to the final product or composition of matter which represents a basic amine or basic polyamine of a more complex type.

Reference is again made to the formula which summarizes the various amines used as intermediate raw materials, viz.:

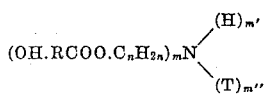

in which the characters have their previous significance.

Attention is directed to the fact that where the substituted alkyl radical OH.R.COO.C₂H₄— appears, a suitable non-aryl radical other than an aliphatic residue may serve as the functional equivalent; for instance, an alicyclic radical derived from a cyclohexyl radical, or an aralkyl radical derived from a benzyl radical. In other words, in the hereto appended claims reference to the $C_nH_{2n}$ radical as such, or as an alkyl radical or residue, is intended in the broad sense to include the alicyclic radicals or residues, or the aralkyl radicals or residues which are the equivalent thereof. There is no intention to include an aromatic radical where there is a direct linkage between the aromatic nucleus and the amino nitrogen atom, for the reason that such products have little or no basicity and do not have the characteristic properties of the amines previously described.

The manufacture of intermediate compounds from tertiary amines is relatively simple, because no precautions are necessary to prevent amidification. The selected fatty oil and the selected hydroxy tertiary amine are mixed in suitable proportions and heated at some point above the boiling point of water; for instance, 110° C., and at a point below the decompositon point of the amine or the fatty oil; for instance, 180° C., for a suitable period of time, such as two to eight hours. Mild agitation is employed. A catalyst, such as sodium oleate, sodium carbonate, caustic soda, etc., may be present in amounts of about one-half of 1% or less. It is noted that the fatty acids are employed in this instance in the form of an ester, to wit, the glyceride, although, as previously pointed out, other functional equivalents can be readily employed with equal facility. It is to be noted that the reactions above described do not take place to any appreciable etxent, if the fatty acid has been converted into the soap or salt. Such salts are not functional equivalents.

When, however, one is employing a hydroxy primary or a hydroxy secondary amine, precautions must be taken so that one gets a substantial percentage of products derived by esterification, rather than amidification. Any suitable ester may be employed, but it is often most convenient to use the glyceride, for instance, triricinolein.

The selected glyceride and the selected hydroxy primary or secondary amine are mixed in suitable proportions and heated at some point above the boiling point of water, for instance, 110° C., and below the decomposition point of the amine or fatty material; for instance, 180° C., for a suitable period of time, such as four to twenty-four hours. Mild agitation is employed. A catalyst, such as sodium oleate, sodium carbonate, caustic soda, etc., may be present in amounts of about one-half percent, or less. It is to be noted that the fatty acids are present in ester form, and not in the form of the free acid, and thus there is no tendency to form the salt to any marked extent, and if conducted at the lower range of reaction temperatures, there is a decided tendency to form the esterification products, rather than the amidification products.

In order to illustrate suitable examples of the amines which may be used as intermediate raw materials, the following examples are given:

*Intermediate amine—Example 1*

Castor oil is employed. For the sake of convenience, its molecular weight is considered as being 925. Commercial triethanolamine and castor oil in the proportion of one mole of castor oil to one mole of triethanolamine are heated at a temperature between 150° and 180° C. for about two hours. Mild agitation is employed. The reaction product so produced may be used as such, or may be converted into the acetate or other suitable form. The product is characterized by freedom from non-esterified alkylol radicals.

*Intermediate amine—Example 2*

Polyethanolamine:

is substituted for triethanolamine in Example 1.

*Intermediate amine—Example 3*

Ethyl dihydroxy stearate is reacted in the previous manner with the various amines above enumerated in Examples 1 and 2. In this case three moles of ethyl dihydroxy stearate are reacted with one mole of the tertiary hydroxyamine.

*Intermediate amine—Example 4*

Methyl hydroxy stearate is employed to replace ethyl dihydroxy stearate in the examples indicated under Example 3 above.

*Intermediate amine—Example 5*

Castor oil (triricinolein) is employed. For convenience its molecular weight is considered as being 925. Commercial diethanolamine and castor oil in the proportion of two moles of castor oil to three moles of diethanolamine are heated at a temperature of 120–140° C. for about 12 hours. Mild agitation is employed. Loss of basicity is an indication of amidification. Time of reaction may be extended or temperature lowered or raised so as to insure maximum esterification. The reaction product, so produced, may be used as such, or may be converted into the acetate or other suitable form. The product should be free from non-esterified alkylol radicals.

*Intermediate amine—Example 6*

Ethanolamine is substituted for diethanolamine in Example 1, using three moles of ethanolamine for one mole of castor oil.

*Intermediate amine—Example 7*

Ethyl ethanolamine is substituted for diethanolamine in Example 1, using three moles of ethyl ethanolamine for one mole of castor oil.

*Intermediate amine—Example 8*

An ether amine of the following composition:

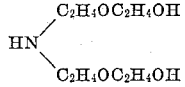

is substituted for diethanolamine in Example 5.

Having prepared the relatively simpler intermediate amine of the kind previously described, the second step in the preparation of the new composition of matter, is to produce an esterified amine of the kind obtainable by reaction of the intermediate amine above described and a polybasic carboxy acid or its functional equivalent, such as the anhydride, with the proviso that such functional equivalent shall not include (a) the acid esters derived by reaction between a polybasic acid, such as phthalic acid or its anhydride, and an alcohol acid (hydroxy acid), such as ricinoleic acid and the like; or (b) the acid ester derived by a reaction between a polybasic carboxy acid, such as phthalic acid and its anhydride, and a fractional ester of the detergent-forming acid, such as mono-olein, mononaphthenin, mono-abietin, etc.

Detergent-forming acids are monobasic carboxy acids, such as typical fatty acids, abietic acids, or naphthenic acids. Typical fatty acids are those which occur in naturally-occurring oils and fats, and generally have eight or more carbon atoms and not over thirty-two carbon atoms. Common examples include oleic acid, stearic acid, linoleic acid, linolenic acid, ricinoleic acid, erucic acid, palmitic acid, etc. These various monohydroxy acids combine with alkali such as caustic soda, caustic potash, etc., to produce soap or soap-like materials, and are commonly referred to as monobasic carboxy detergent-forming acids.

These last mentioned classes of materials which are not contemplated in the present invention are described in the two U. S. Patents Nos. 2,166,431 and 2,166,433, to Melvin De Groote, dated July 18, 1939.

The polybasic carboxy acids which may be employed, including some having at least three carboxyl radicals, are phthalic, succinic, malic, fumaric, citric, maleic, adipic, tartaric, glutaric, diphenic, naphthalic, oxalic, etc.

In view of what has been said previously, such polybasic carboxy acid ester must be of the kind in which there is available at least one carboxyl radical attached to the polybasic carboxy acid residue, and at least one of such carboxy radical or radicals must be esterified with a hydroxylated amine, such as monoethanolamine, monopropanolamine, monobutanolamine, or any one of a number of other hydroxylated amines of the kind hereinafter described. Needless to say, the final esterification step, for instance, the step involving the use of ethanolamine and phthalic anhydride, may take place previous to the esterification with the intermediate amine of the kind above described. For instance, one mole of ethanolamine may be treated with one mole of phthalic anhydride; and a properly obtained resultant product indicated by the following type formula:

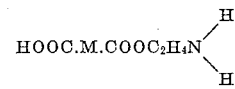

in which M indicates a polybasic carboxy acid residue, may be employed to esterify an intermediate amine of the kind above described. Similar products may be produced from other suitable amines and other suitable polybasic carboxy acid. However, in order to prevent the formation of imide acids and the like, it is often necessary to form such products by reaction between an acid ester, for instance, methyl hydrogen phthalate, and the selected amine such as ethanolamine. However, it is immaterial in what manner or how chemical compounds of the type formulas above referred to are obtained. Other suitable compounds, of course, may be indicated by the following type formulas:

It is obvious to the skilled chemist that in addition to the basic hydroxylated amines which have already been enumerated, and which are suitable for reaction with the carboxylic radical of a polybasic carboxy acid or residue, one may also employ acylated types, in which an oxyacyl radical, i. e., acid radical, derived from acetic acid or from a non-hydroxylated detergent acid of the kind previously referred to, replaces a hydroxyl of a hydroxy hydrocarbon radical attached to the amino nitrogen atom. For example, one mole of diethanolamine may be esterified with one mole of acetic acid, or one mole of oleic acid, or one mole of abietic acid, or one mole of naphthenic acid. Similarly, two moles of such acids may be esterified with one mole of triethanolamine. In event that glycerylamine or a similar polyhydroxylated amine is employed, then one may have an analogous compound, which is characterized by the presence of a hydroxyl group, as well as an oxy-acyl radical. In other words, suitable amines may be indicated by the following formula:

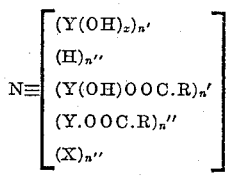

in which N indicates the conventional trivalent nitrogen atom; Y indicates a hydrocarbon radical; R indicates a non-hydroxylated acid containing not more than 32 carbon atoms; and X indicates a monovalent hydrocarbon radical; $x$ indicates the numeral one or two; $n'$ indicates the numeral zero, one, two, or three; $n''$ indicates the numeral zero, one, or two; with the proviso that the amine must contain at least one hydroxyl radical attached to a hydrocarbon radical, and obviously, that the total number of the groups attached to the nitrogen atom are three. A hydrocarbon radical interrupted by an oxygen atom is considered herein and in the claims as being the functional equivalent of an uninterrupted hydrocarbon radical.

*Semi-finished esterification product, Example 1*

Castor oil is reacted with triethanolamine (see Example 1 in previous group of intermediate amine examples), so as to produce material corresponding to $(OH.R.COO.C_2H_4)_3N$, in which OH.R.COO represents the ricinoleic acid radical. One molecular weight of this material is reacted with three molecular weights of phthalic anhydride. This is a conventional esterification reaction, and the materials are intimately mixed and heated to approximately 120–160° C., with constant agitation, until samples taken from the batch and analyzed show substantially complete disappearance of the hydroxyl value and substantially no free phthalic anhydride. In event that the hydroxyl value disappears and phthalic anhydride is still present, the amount should be decreased to approximately 2¼ or 2½ moles, or thereabouts. A suitable solvent may be present, and any water formed may be distilled off continuously during the esterification process. The solvent may remain behind in the final product, or may be removed, if desired.

*Semi-finished esterification product, Example 2*

The same procedure is followed as in Example 1 above, except that the intermediate product is prepared from commercial diethanolamine and castor oil. See Intermediate amine, Example 5.

Having prepared the semi-finished esterification products above described it is only necessary to react such complex esters which are essentially half or fractional acids or fractional esters with the selected hydroxylated amine of the type previously described. It is necessary to note that simple mixture of the two produces a salt and not an ester, and that in order to produce esterification, one must heat to a temperature above the boiling point of water and below the point of decomposition. In other words, the conditions of esterification are those conventionally employed, and are comparable to the conditions employed preferably in the manufacture of the intermediate amine, and also in the mnaufacture of the semi-finished esterification product.

*Composition of matter—Example 1*

A suitable quantity of the semi-finished esterification product produced according to Semi-finished esterification product, Example 1, is neutralized with sufficient triethanolamine to eliminate one-third of the free acidity. The product is heated until substantially all, and preferably all, of the acidity, due to the presence of the hydrogen carboxyl radical has disappeared, or at least, to the point where water is no longer driven off.

*Composition of matter—Example 2*

The same procedure is followed as in Composition of matter, Example 1, preceding, except that the amount of triethanolamine added is sufficient to neutralize two-thirds of the acidity before the final esterification step.

*Composition of matter—Example 3*

The same procedure is followed as in Composition of matter, Example 1, except that sufficient triethanolamine is added to completely neutralize all the acidity before the final esterification step.

*Composition of matter—Example 4*

The same procedure is followed as in Example 1, except that one employs semi-finished esterification product Example 2, instead of Example 1, and sufficient triethanolamine is added to neutralize one-half the total acidity.

*Composition of matter—Example 5*

The same procedure is followed as in Example 4, except that sufficient triethanolamine is added to neutralize all the acidity before the final esterification step.

*Composition of matter—Example 6*

Maleic anhydride is substituted for phthalic anhydride in Composition of matter, Examples 1–5, inclusive, preceding.

*Composition of matter—Example 7*

Citric acid is substituted for phthalic anhydride in Composition of matter, Examples 1–5, inclusive, preceding.

Attention is directed to the fact that the alkylolamines are obtained in such a manner that they may be looked upon as being derivatives of dihydric alcohols, or of the chlorhydrins of the dihydric alcohols. For example, the alkylolamines may be prepared as follows:

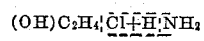

As previously stated, the $C_2H_4$ radical may be any one of a number of hydrocarbon radicals which are aliphatic, alicyclic, or aralkyl in nature.

It is at once manifest that similar derivatives are available from glycerols, polyglycerols, and the like, as indicated by the following reaction:

It is not necessary to point out that the same types of reactions will produce secondary or tertiary amines, and that the reaction is not limited to a combination with ammonia, but may take place with a combination of other primary or secondary amines, such as amylamine, diamylamine, cyclohexylamine, dicyclohexylamine, benzylamine, dibenzylamine, amylcyclohexylamine, etc.

This means that in the type of material previously described, there is a wide variety of material, such as monoglycerylamine, diglycerylamine, monoglyceryl diethanolamine, monoglyceryl dipropylamine, diglyceryl propylamine, triglycerylamine, etc., which are functional equivalents of the various amines previously described for reaction with triricinolein and the like. When such amines are employed, instead of the radical ——$C_nH_{2n}$—— appearing in a compound, one would have in place thereof the radical ——$OH.C_3H_5$——; or, in case the hydroxyl radical of these ——$OH.C_3H_5$—— radicals had been removed by esterification with any available carboxyl, then the substituent which replaces the ——$C_3H_5$—— radical might be indicated by the formula ——$D'.C_3H_5$——. All that has been said here in regard to functional equivalents will be perfectly obvious without further explanation to those skilled in the art. See U. S. Patent No. 2,091,704, dated August 31, 1937, to Duncan and McAllister; and also U. S. Patent No. 2,042,621, dated June 2, 1936, to Olin.

Similarly, it is evident that where reference is made to phthalic acid, some simple derivative, such as chlorinated phthalic acid, brominated phthalic acid, methylated phthalic acid, or the like, would simply act as a functional equivalent. This applies not only to phthalic acid, but to all the dibasic acids enumerated. Similarly, it is evident that there is no intention to differentiate between isomeric forms. One isomeric form may serve as well as another.

We are aware that in complex esterifications of the kind indicated, one may obtain products which are resinous or semi-resinous in nature and represent polymeric or semi-polymeric forms of simple monomers, which may perhaps be indicated by structural formulas of a rather complex nature. If one cares to indicate the product by a structural formula which contemplates the monomer, then obviously the polymer would represent such bracketed monomer followed by a sub-letter $n$ to indicate the polymeric form, with the proviso that a certain amount of water would be eliminated in the polymeric form; and thus, the composition of the polymeric form and the monomeric form, as far as structural formulas go, would be slightly different. But it is our intention that if the product need be designated by a structural formula, the formula for the monomer shall be understood to also include the structure for the polymer.

As has been pointed out previously, where fatty acids occur or polybasic carboxy acids occur, or residues thereof, any ionizable hydrogen atom or the equivalent thereof may be replaced by a suitable metallic atom, such as a sodium atom or an ammonium radical or an amine radical, or an organic radical derived from an amine, particularly a hydroxylated amine, or from a monohydric or polyhydric alcohol. As to this equivalency, we again emphasize that it is intended that in the claims and specification, the expression "fatty acid compound" or "polybasic carboxy acid compound" shall contemplate all the various forms; and we specifically include all the functional equivalents which have been described in great detail in our aforementioned pending application.

The functional equivalents of all these variations have been pointed out previously and are readily comprehended; and the scope of the claims in the light of such obvious equivalents requires no further discussion.

As to blown oils, blown fatty acids, polymerized oils, polymerized fatty acids, and other similar materials obtainable by oxidation, it is understood that it is not intended that they should be reacted with amines to produce the intermediate amine, which, in turn, is reacted with a polybasic carboxy acid, and then with the designated amine, to produce the new composition of matter.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexy alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the new material or composition of matter herein described, when employed as a demulsifying agent for resolving petroleum emulsions, is based upon its ability to treat certain emulsions more advantageously and at a somewhat lower cost than is possible with other available demulsifiers, or conventional mixtures thereof.

It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In using our new material or composition of matter to break a petroleum emulsion, said material is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

Having thus described our invention, what we claim as new and desire to secure by Letters Patent is:

1. A product derived by an esterification reaction between: first, an amine of the formula type:

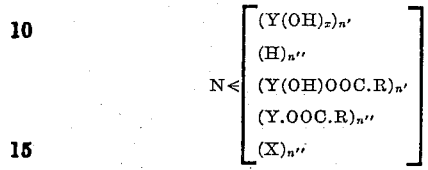

in which N indicates the conventional trivalent nitrogen atom; Y indicates a hydrocarbon radical; R indicates a non-hydroxylated acid containing not more than 32 carbon atoms; and X indicates a monovalent hydrocarbon radical; $x$ indicates the numeral one or two; $n'$ indicates the numeral zero, one, two, or three; $n''$ indicates the numeral zero, one, or two; with the proviso that the amine must contain at least one hydroxyl radical attached to a hydrocarbon radical and obviously that the total number of the groups, including hydrogen atoms, if any, attached to the nitrogen atom are three; and second, a fractional ester containing at least one free carboxyl radical and derived by esterification reaction between: on the one hand, an amine of the formula type:

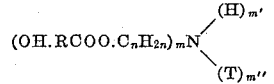

in which OH.RCOO represents the oxy-acyl radical derived from a hydroxylated fatty acid; T represents a member of the class consisting of hydrocarbon radicals, and the non-hydroxy acylated radicals obtained by replacing the hydrogen atom of the hydroxyl group of an alkylol radical by the acyl radical of a monobasic carboxy acid having less than 32 carbon atoms; $n$ represents a small whole number which is less than 10; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

2. A product derived by an esterification reaction between: first, an amine of the formula type:

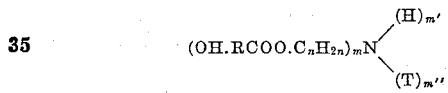

in which N indicates the conventional trivalent nitrogen atom; Y indicates a hydrocarbon radical; R indicates a non-hydroxylated acid containing not more than 32 carbon atoms; and X indicates a monovalent hydrocarbon radical; $x$ indicates the numeral one or two; $n'$ indicates the numeral zero, one, two, or three; $n''$ indicates the numeral zero, one, or two; with the proviso that the amine must contain at least one hydroxyl radical attached to a hydrocarbon radical and obviously that the total number of the groups, including hydrogen atoms, if any, attached to the nitrogen atom are three; and second, a fractional ester containing at least one free carboxyl radical and derived by esterification reaction between: on the one hand, an amine of the formula type:

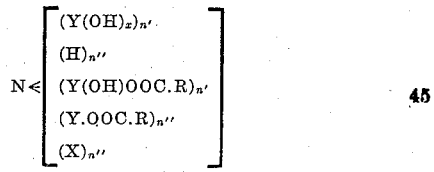

in which OH.RCOO represents the oxy-acyl radical derived from a hydroxylated fatty acid; T represents a member of the class consisting of hydrocarbon radicals and the non-hydroxy acylated radicals obtained by replacing a hydrogen atom of the hydroxyl group of an alkylol radical by the acyl radical of a monobasic carboxy acid having less than 32 carbon atoms; $C_nH_{2n}$ being an aliphatic radical; $n$ represents a small whole number which is less than 10; $m$ represents the numeral 1, 2 or 3; $m'$ represents the numeral 0, 1, or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

3. A product derived by an esterification reaction between: first, an amine of the formula type:

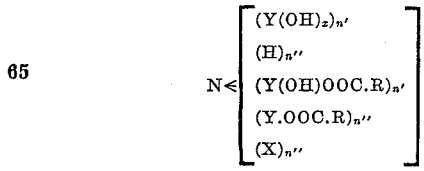

in which N indicates the conventional trivalent nitrogen atom; Y indicates a hydrocarbon radical; R indicates a nonhydroxylated acid containing not more than 32 carbon atoms; and X indicates a monovalent hydrocarbon radical; $x$ indicates the numeral one or two; $n'$ indicates the numeral zero, one, two, or three; $n''$ indicates the numeral zero, one, or two; with the proviso that the amine must contain at least one hydroxyl radical attached to a hydrocarbon radical and obviously that the total number of the groups, including hydrogen atoms, if any, attached to the nitrogen atom are three; and second, a fractional ester containing at least one free carboxyl radical and derived by esterification reaction between: on the one hand, an amine of the formula type:

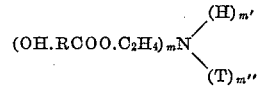

in which OH.RCOO represents the oxy-acyl radical derived from a hydroxylated fatty acid; T represents a member of the class consisting of hydrocarbon radicals and the non-hydroxy acylated radicals obtained by replacing a hydrogen atom of the hydroxyl group of an alkylol radical by the acyl radical of a monobasic carboxy acid having less than 32 carbon atoms; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

4. A product derived by an esterification reaction between: first, an amine of the formula type:

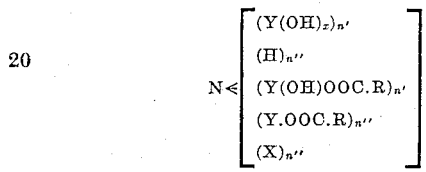

in which N indicates the conventional trivalent nitrogen atom; Y indicates a hydrocarbon radical; R indicates a non-hydroxylated acid containing not more than 32 carbon atoms; and X indicates a monovalent hydrocarbon radical; $x$ indicates the numeral one or two; $n'$ indicates the numeral zero, one, two, or three; $n''$ indicates the numeral zero, one, or two; with the proviso that the amine must contain at least one hydroxyl radical attached to a hydrocarbon radical and obviously that the total number of the groups, including hydrogen atoms, if any, attached to the nitrogen atom are three; and second, a fractional ester containing at least one free carboxyl radical and derived by esterification reaction between: on the one hand, an amine of the formula type:

$$(OH.RCOO.C_2H_4)_mN(H)_{m'}$$

in which OH.RCOO represents the oxy-acyl radical derived from ricinoleic acid; $m$ represents the numeral 1, 2 or 3; $m'$ represents the numeral 0, 1 or 2, with the proviso that $m+m'=3$; and on the other hand, a polybasic carboxyl acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

5. A product derived by an esterification reaction between: first, an alkanolamine; and second, a fractional ester containing at least one free carboxyl radical and derived by esterification reaction between: on the one hand, an amine of the formula type:

$$(OH.RCOO.C_2H_4)_mN(H)_{m'}$$

in which OH.RCOO represents the oxy-acyl radical derived from ricinoleic acid; $m$ represents the numeral 1, 2 or 3; $m'$ represents the numeral 0, 1 or 2, with the proviso that $m+m'=3$; and on the other hand, a polybasic carboxyl acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

6. A product derived by an esterification reaction between: first, an alkanolamine; and second, a fractional ester containing at least one free carboxyl radical and derived by esterification reaction between: on the one hand, an amine of the formula type:

$$(OH.RCOO.C_2H_4)_mN(H)_{m'}$$

in which OH.RCOO represents the oxy-acyl radical derived from ricinoleic acid; $m$ represents the numeral 1, 2 or 3; $m'$ represents the numeral 0, 1 or 2, with the proviso that $m+m'=3$; and on the other hand, phthalic anhydride.

7. A product derived by an esterification reaction between: first, an ethanolamine; and second, a fractional ester containing at least one free carboxyl radical and derived by esterification reaction between: on the one hand, an amine of the formula type:

$$(OH.RCOO.C_2H_4)_mN(H)_{m'}$$

in which OH.RCOO represents the oxy-acyl radical derived from ricinoleic acid; $m$ represents the numeral 1, 2 or 3; $m'$ represents the numeral 0, 1 or 2, with the proviso that $m+m'=3$; and on the other hand, phthalic anhydride.

8. A product derived by an esterification reaction between: first, triethanolamine; and second, a fractional ester containing at least one free carboxyl radical and derived by esterification reaction between: on the one hand, an amine of the formula type:

$$(OH.RCOO.C_2H_4)_mN(H)_{m'}$$

in which OH.RCOO represents the oxy-acyl radical derived from ricinoleic acid; $m$ represents the numeral 1, 2 or 3; $m'$ represents the numeral 0, 1 or 2, with the proviso that $m+m'=3$; and on the other hand, phthalic anhydride.

MELVIN DE GROOTE.
BERNHARD KEISER.
CHARLES M. BLAIR, Jr.